Patented Dec. 19, 1939

2,183,652

UNITED STATES PATENT OFFICE 2,183,652

MANUFACTURE OF AMINO COMPOUNDS OF THE ANTHRAQUINONE SERIES

Geoffrey Lord and George Reeves, Spondon, near Derby, England, assignors to Celanese Corporation of America, a corporation of Delaware No Drawing. Application January 11, 1938, Serial No. 184,397. In Great Britain January 20, 1937

10 Claims. (Cl. 260—378)

This application relates to the manufacture of amino and aliphatically substituted amino derivatives of anthraquinone.

In U. S. Patent No. 2,128,307 processes are described wherein anthraquinone compounds which contain a hydroxy, amino or substituted amino group in the 1- and 4-positions in the anthraquinone nucleus are treated with ammonia or aliphatic amines so as to replace at least one of the said groups with the residue of ammonia or of the aliphatic amine. The treatment is effected in the presence of compounds of metals other than alkali metals, and especially heavy metals. Metals which are particularly advantageous are those capable of forming complex nitrogenous compounds with nitrogenous bases.

In the said application various methods of carrying out the process are described, and it is stated that the reaction is preferably effected in a liquid capable of dissolving part or the whole of the reactants under the reaction conditions. Alcohol is stated to be a suitable liquid for the purpose.

It has now been discovered that where, in carrying out the processes of the said application the initial anthraquinone compound is at least slightly soluble in dilute aqueous solutions of caustic alkalies, the process may very advantageously be effected in the presence of dilute aqueous solutions of caustic alkalies. As examples of caustic alkalies, caustic soda and caustic potash may be instanced.

The invention is of particular value in connection with the treatment of hydroxy derivatives of anthraquinone, which are in general readily soluble in dilute aqueous solutions of caustic alkalies, but may also be employed in the treatment of amino or substituted amino derivatives of anthraquinone where such anthraquinone derivatives are at least slightly soluble in dilute aqueous solutions of caustic alkalies. As examples of anthraquinone derivatives which may be treated according to this invention there may be mentioned quinizarin, 1, 4, 5-trihydroxy-anthraquinone, 1, 4, 5, 8-tetrahydroxy-anthraquinone, 1-amino-4, 5, 8-trihydroxy-anthraquinone, 1-hydroxy-4-amino-anthraquinone, and 1-hydroxy-4-methylamino-anthraquinone.

Where the products obtained are insoluble or only slightly soluble in the reaction medium they will be precipitated therefrom as formed. This is advantageous for many purposes and the process of the present invention is therefore preferably carried out in a reaction medium which has at most only a slight solvent power for the products obtained. Thus for example, in the treatment of quinizarin with a sufficiency of methylamine to produce 1,4-di-(methylamino)-anthraquinone the reaction may be effected in the presence of a dilute aqueous solution of caustic soda as the sole liquid present, whereupon the 1,4-di-(methylamino)-anthraquinone is precipitated from the solution as formed.

The concentration of the dilute aqueous caustic alkali solution employed may be varied according to the solubility of the anthraquinone compound to be treated but in general concentrations of ½ to about 5% are satisfactory.

As in U. S. Patent No. 2,128,307 the reaction is carried out in the presence of a compound of a metal other than an alkali metal and especially a compound of a heavy metal. Compounds of metals which are capable of forming a complex nitrogenous compound with a nitrogenous base are especially advantageous. Compounds of any of the metals specifiied in the said application may be employed according to the present invention; very satisfactory results have been obtained by the use of salts, oxides or hydroxides of manganese or copper. The metal compounds may be employed in the same general proportions as in the said application.

The invention is of greatest importance where the reaction is effected with ammonia or with a volatile aliphatic amine, e. g. mono-methylamine, but other aliphatic amines may be used. Where the reaction is effected with amines, they may be aliphatic mono-, di- or poly-amines. By the term "aliphatic amine" is meant an amine containing an amino group not directly attached to an aryl residue. Similarly, by the expression "aliphatically substituted amino groups" is meant substituted amino groups in which the substituents are wholly aliphatic in character or are such that if aryl residues are present therein, carbon of the aryl residues is not directly attached to the amino groups. As examples of suitable aliphatic amines may be mentioned alkylamines, e. g. mono-methylamine, referred to above, and monoethylamine; polyamines, e. g. ethylene diamine, α,β-diamino propane, α,γ-diamino propane, unsymmetrical diethyl ethylene diamine; substituted alkylamines, e. g. hydroxy alkylamines as, for instance, β-hydroxy ethylamine or β,γ-dihydroxy propylamine; hydroaromatic amines, e. g. cyclohexylamine and nuclear methyl or other alkyl cyclohexylamines; and aralkylamines, including both aralkylamines free from substituents in the aromatic nucleus and aralkylamines substituted in the aromatic nucleus, e. g. benzylamine and parasulphobenzylamine. Amines containing up to 7 or 8 carbon atoms are of particular value.

The following examples illustrate the invention but are not to be regarded as limiting it in any way:—

*Example 1*

An autoclave is charged with

|  | Parts |
|---|---|
| Quinizarin | 192 |
| Caustic soda | 80 |
| 25% aqueous solution of monomethylamine | 112 |
| Copper sulphate crystals | 1 |
| Water | 3200 |

The autoclave is sealed and heated at 95–100° C. for 8 hours. On cooling, the contents of the autoclave are blown out on to a suction filter, sucked as dry as possible, washed with hot water and dried. The product is 1-methylamino-4-hydroxy-anthraquinone.

*Example 2*

An autoclave is charged with

|  | Parts |
|---|---|
| Quinizarin | 192 |
| Caustic soda | 32 |
| 25% solution of methylamine | 256 |
| Copper sulphate crystals | 1 |
| Water | 3200 |

The autoclave is sealed and heated at 140° C. for 8 hours. The autoclave is then cooled and the contents worked up as in Example 1. The product is 1,4-dimethylamino-anthraquinone.

*Example 3*

A mixture of

|  | Parts |
|---|---|
| Quinizarin | 20 |
| Caustic soda | 3.3 |
| Monoethanolamine | 20 |
| Manganese chloride | 1 |
| Water | 400 | is refluxed for 42 hours. On cooling, bronze coloured crystals of 1,4-di-(hydroxyethylamino)-anthraquinone separate out.

*Example 4*

A mixture of

|  | Parts |
|---|---|
| Quinizarin | 20 |
| Caustic soda | 13 |
| Monoethanolamine | 10 |
| Manganese chloride | 1 |
| Water | 400 | is refluxed for 24 hours and cooled. The product, 1-hydroxy-ethylamino-4-hydroxy-anthraquinone, is filtered off and washed with hot water.

*Example 5*

A mixture of

|  | Parts |
|---|---|
| 1:4:5-trihydroxy-anthraquinone | 21 |
| Caustic soda | 3.3 |
| Monoethanolamine | 20 |
| Copper sulphate | 1 |
| Water | 450 | is refluxed for 36 hours and worked up as in Example 4. The product is 1:4-di-(hydroxyethylamino)-5-hydroxy-anthraquinone.

*Example 6*

A mixture of

|  | Parts |
|---|---|
| 1:4:5:8-tetrahydroxy-anthraquinone | 27 |
| Caustic soda | 3.3 |
| Monoethanolamine | 20 |
| Copper sulphate | 1 |
| Water | 500 | is refluxed for 36 hours and the product worked up as before. The product is 1:4-di-(hydroxyethylamino)-5:8-dihydroxy-anthraquinone.

The expression "substituted amino group" in the following claims is intended to include amino groups which are substituted by aliphatic, aromatic or cycloaliphatic groups, e. g. methyl, ethyl and other alkyl groups, phenyl and other aryl groups, benzyl and other aralkyl groups, and cyclohexyl and other cycloaliphatic groups.

Having described our invention what we desire to secure by Letters Patent is:

1. Process for the manufacture of amino and aliphatically substituted amino derivatives of anthraquinone, which comprises reacting with an agent selected from the group consisting of ammonia and aliphatic amines, in the presence of a compound of a metal capable of forming a complex nitrogenous compound with a nitrogenous base, and in a reaction medium which consists apart from the reactants substantially entirely of a dilute aqueous solution of caustic alkali, an anthraquinone compound which is at least slightly soluble in dilute aqueous solutions of caustic alkali and which contains in one of the 1- and 4- positions a substituent hydroxy radicle and in the other of such positions a radicle selected from the group consisting of the hydroxy, amino and substituted amino radicles, so as to replace a hydroxy radicle by a residue of the agent employed.

2. Process for the manufacture of an anthraquinone derivative which contains in at least one of the 1- and 4- positions a radicle selected from the group consisting of amino and aliphatically substituted amino radicles, which comprises reacting with an agent selected from the group consisting of ammonia and aliphatic amines, in the presence of a compound of a metal capable of forming a complex nitrogenous compound with a nitrogenous base, and in a reaction medium which consists apart from the reactants substantially entirely of a dilute aqueous solution of caustic alkali, an anthraquinone compound which is at least slightly soluble in dilute aqueous solutions of caustic alkali and which contains in the 1- and 4- positions substituent radicles selected from the group consisting of hydroxy, amino or substituted amino radicles, so as to replace at least one of said substituent radicles by a residue of the agent employed.

3. Process for the manufacture of amino and aliphatically substituted amino derivatives of anthraquinone, which comprises reacting with an agent selected from the group consisting of ammonia and aliphatic amines, in the presence of a compound of a metal capable of forming a complex nitrogenous compound with a nitrogenous base, and in a reaction medium which consists apart from the reactants substantially entirely of a 0.5 to 5% aqueous solution of caustic alkali, an anthraquinone compound which is at least slightly soluble in such a solution of caustic alkali and which contains in one of the 1- and 4-positions a substituent hydroxy radicle and in the other of such positions a radicle selected from the group consisting of the hydroxy, amino and substituted amino radicles, so as to replace a hydroxy radicle by a residue of the agent employed.

4. Process for the manufacture of an anthraquinone derivative which contains in at least one of the 1- and 4- positions a substituent selected from the group consisting of amino and aliphatically substituted amino groups, which comprises reacting with an agent selected from the group consisting of ammonia and aliphatic amines, in the presence of a compound of a metal capable of forming a complex nitrogenous compound with a nitrogenous base, and in a reaction medium which consists apart from the reactants substantially entirely of a 0.5 to 5% aqueous solution of caustic alkali, an anthraquinone compound which is at least slightly soluble in such a solution of caustic alkali and which contains in the 1- and 4- positions substituent radicles selected from the group consisting of hydroxy, amino or substituted amino radicles, so as to replace at least one of said substituent radicles by a residue of the agent employed.

5. Process for the manufacture of amino and aliphatically substituted amino derivatives of anthraquinone, which comprises reacting with an agent selected from the group consisting of ammonia and aliphatic amines, in the presence of a metal compound selected from the group consisting of the salts, oxides and hydroxides of manganese and copper, and in a reaction medium which consists apart from the reactants substantially entirely of a dilute aqueous solution of caustic alkali, an anthraquinone compound which is at least slightly soluble in dilute aqueous solutions of caustic alkali and which contains in one of the 1- and 4- positions a substituent hydroxy radicle and in the other of such positions a radicle selected from the group consisting of hydroxy, amino and substituted amino radicles, so as to replace a hydroxy radicle by a residue of the agent employed.

6. Process for the manufacture of an anthraquinone derivative which contains in at least one of the 1- and 4- positions a substituent selected from the group consisting of amino and aliphatically substituted amino groups, which comprises reacting with an agent selected from the group consisting of ammonia and aliphatic amines, in the presence of a metal compound selected from the group consisting of the salts, oxides and hydroxides of manganese and copper, and in a reaction medium which consists apart from the reactants substantially entirely of a dilute aqueous solution of caustic alkali, an anthraquinone compound which is at least slightly soluble in dilute aqueous solutions of caustic alkali and which contains in the 1- and 4- positions substituent radicles selected from the group consisting of hydroxy, amino or substituted amino radicles, so as to replace at least one of said substituent radicles by a residue of the agent employed.

7. Process for the manufacture of amino and aliphatically substituted amino derivatives of anthraquinone, which comprises reacting with an agent selected from the group consisting of ammonia and aliphatic amines, in the presence of a compound of a metal capable of forming a complex nitrogenous compound with a nitrogenous base, and in a reaction medium which consists apart from the reactants substantially entirely of a dilute aqueous solution of caustic alkali, an anthraquinone compound which is at least slightly soluble in dilute aqueous solutions of caustic alkali and which contains in one of the 1- and 4-positions a substituent hydroxy radicle and in the other of such positions a radicle selected from the group consisting of the hydroxy, amino and substituted amino radicles, so as to replace a hydroxy radicle by a residue of the agent employed, the proportion of the said metal compound present during the reaction being 0.1 to 5% on the weight of the anthraquinone compound treated.

8. Process for the manufacture of an anthraquinone derivative which contains in at least one of the 1- and 4-positions a substituent selected from the group consisting of amino and aliphatically substituted amino groups, which comprises reacting with an agent selected from the group consisting of ammonia and aliphatic amines, in the presence of a compound of a metal capable of forming a complex nitrogeneous compound with a nitrogeneous base, and in a reaction medium which consists apart from the reactants substantially entirely of a dilute aqueous solution of caustic alkali, an anthraquinone compound which is at least slightly soluble in dilute aqueous solutions of caustic alkali and which contains in the 1- and 4-positions substituent radicles selected from the group consisting of hydroxy, amino or substituted amino radicles, so as to replace at least one of said substituent radicles by a residue of the agent employed, the proportion of the said metal compound present during the reaction being 0.1 to 5% on the weight of the anthraquinone compound treated.

9. Process for the manufacture of amino and aliphatically substituted amino derivatives of anthraquinone, which comprises reacting with an agent selected from the group consisting of ammonia and aliphatic amines, in the presence of a metal compound selected from the group consisting of the salts, oxides and hydroxides of manganese and copper, and in a reaction medium which consists apart from the reactants substantially entirely of a 0.5 to 5% aqueous solution of caustic alkali, an anthraquinone compound which is at least slightly soluble in such a solution of caustic alkali and which contains in one of the 1- and 4-positions a substituent hydroxy radicle and in the other of such positions a radicle selected from the group consisting of the hydroxy, amino and substituted amino radicles, so as to replace a hydroxy radicle by a residue of the agent employed, the proportion of the said metal compound present being 0.1 to 5% on the weight of the anthraquinone compound treated.

10. Process for the manufacture of an anthraquinone derivative which contains in at least one of the 1- and 4-positions substituents selected from the group consisting of amino and aliphatically substituted amino groups, which comprises reacting with an agent selected from the group consisting of ammonia and aliphatic amines, in the presence of a metal compound selected from the group consisting of the salts, oxides and hydroxides of manganese and copper, and in a reaction medium which consists apart from the reactants substantially entirely of a 0.5 to 5% aqueous solution of caustic alkali, an anthraquinone compound which is at least slightly soluble in such a solution of caustic alkali and which contains in the 1- and 4-positions substituent radicles selected from the group consisting of hydroxy, amino and substituted amino radicles, so as to replace at least one of said substituents by a residue of the agent employed, the proportion of the said metal compound present being 0.1 to 5% on the weight of the anthraquinone compound treated.

GEOFFREY LORD.
GEORGE REEVES.